May 2, 1961   E. F. KLEINSCHMIDT ET AL   2,982,817
TAPE CONTROLLED TRANSMITTER

Filed July 12, 1956   10 Sheets-Sheet 1

Inventors
Edward F. Kleinschmidt,
Carl P. Anderson
BY Strauch, Nolan & Neale

May 2, 1961 E. F. KLEINSCHMIDT ET AL 2,982,817
TAPE CONTROLLED TRANSMITTER
Filed July 12, 1956 10 Sheets-Sheet 3
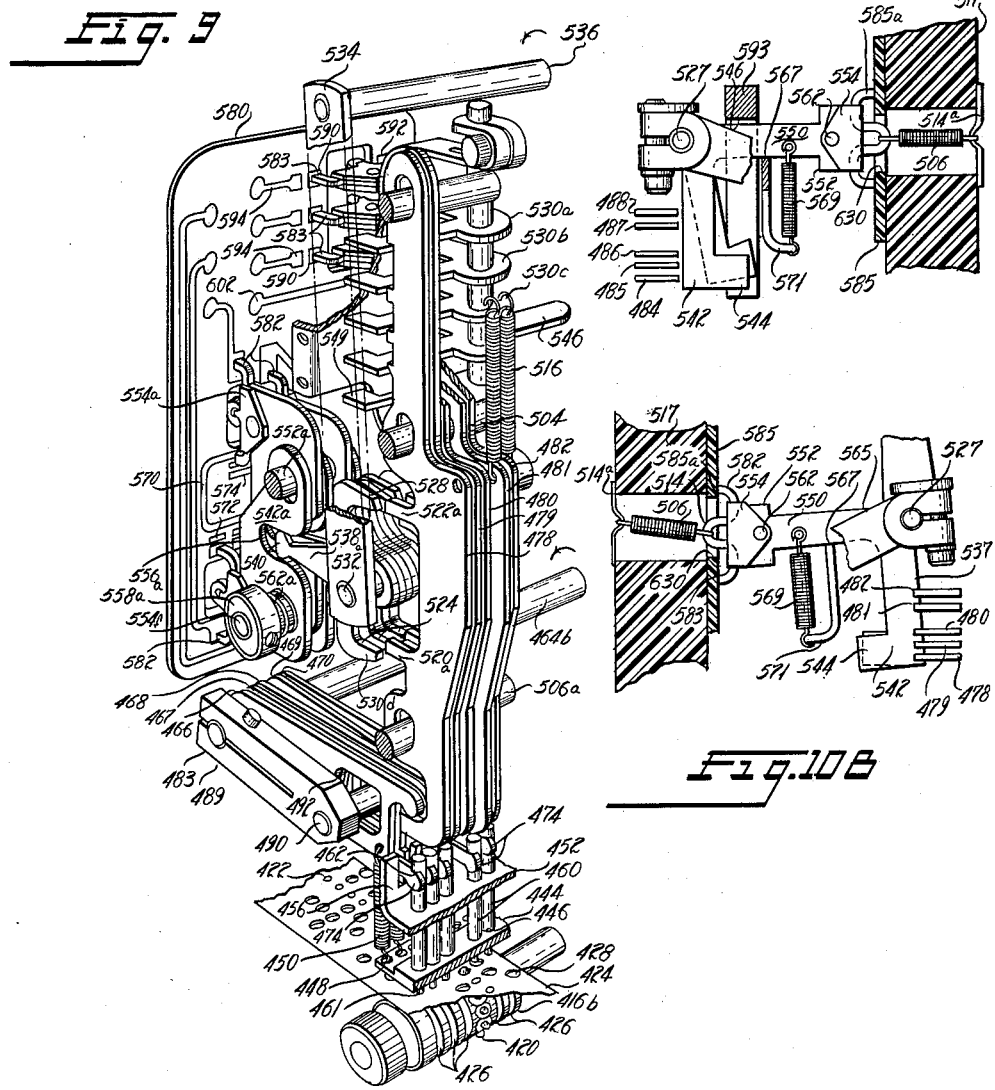
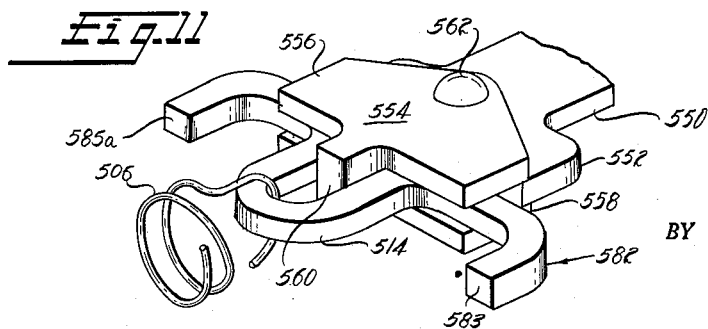
Inventors
EDWARD F. KLEINSCHMIDT
CARL P. ANDERSON
BY Strauch, Nolan & Neale

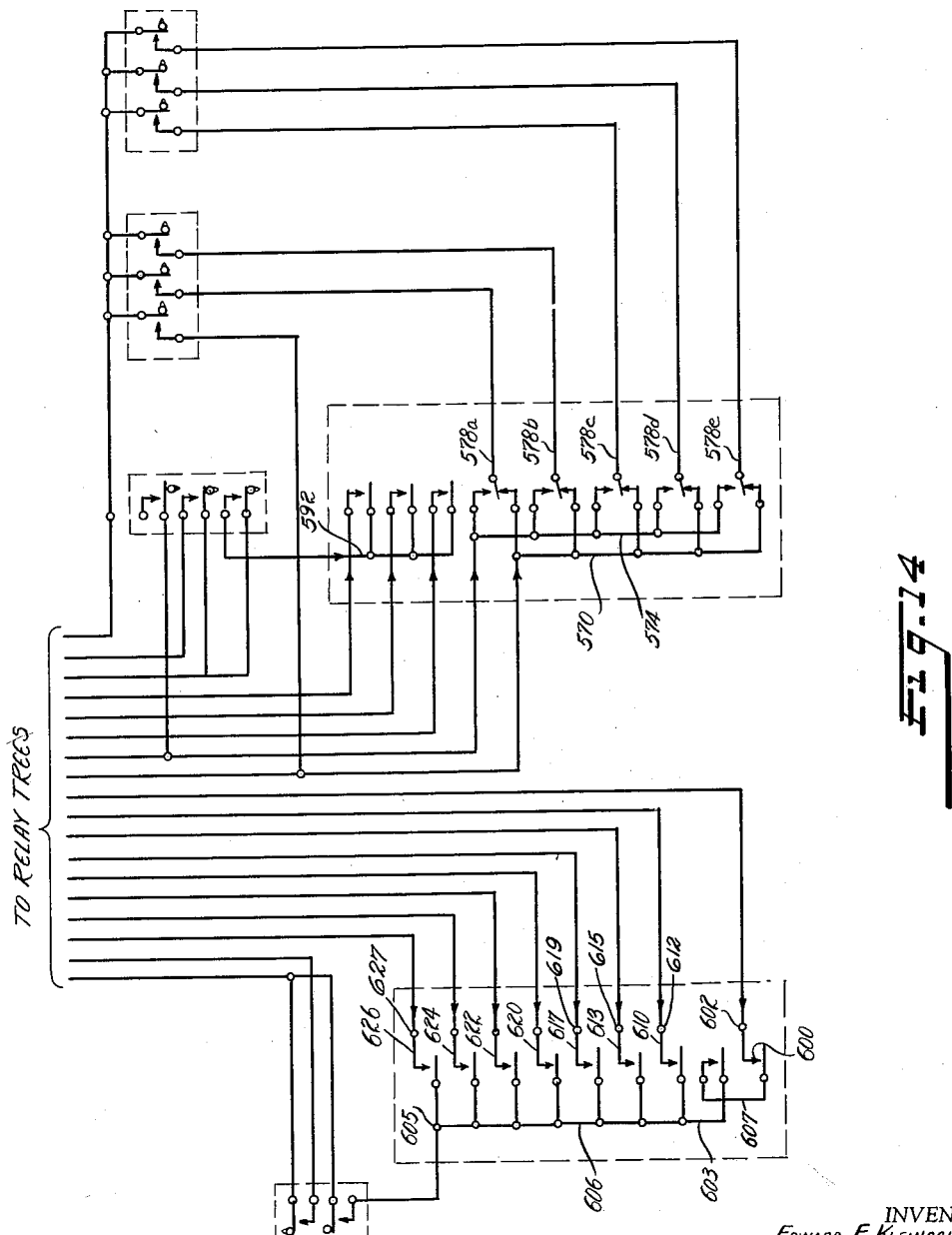

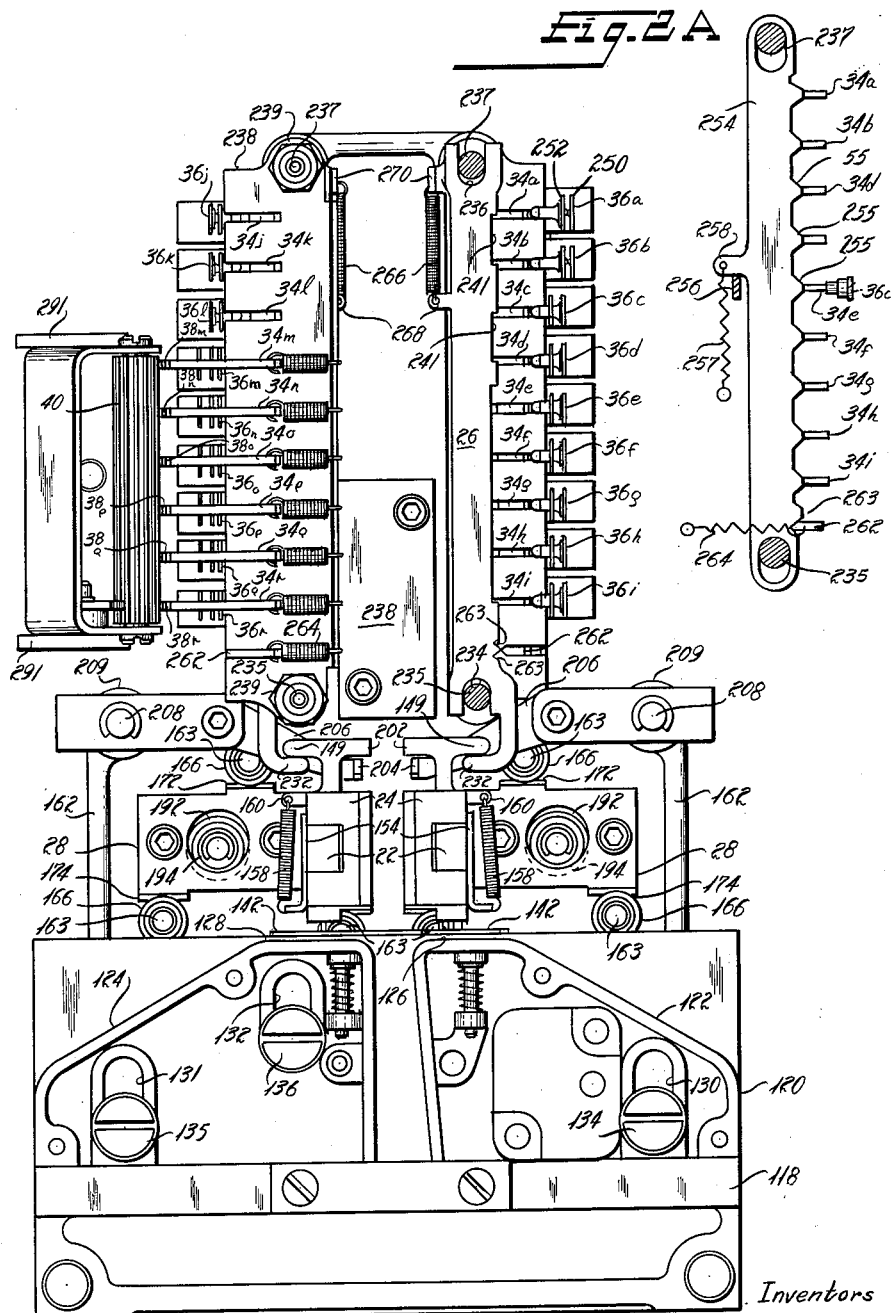

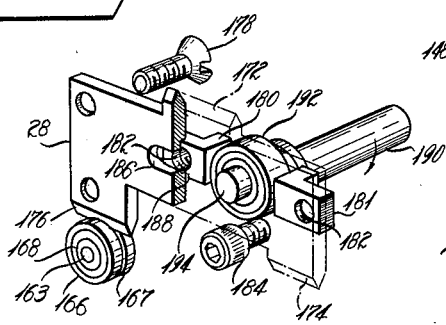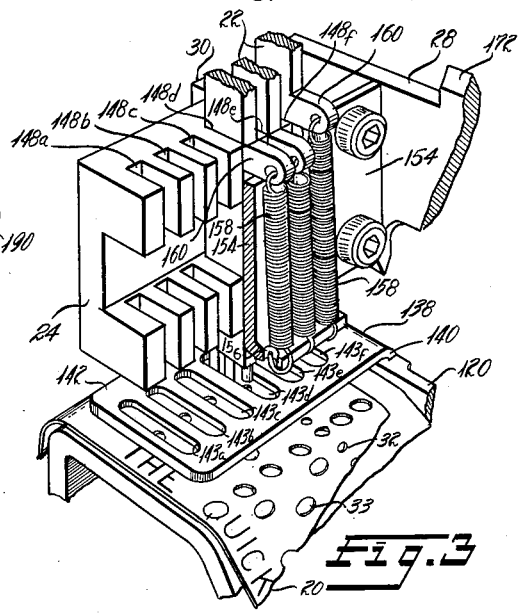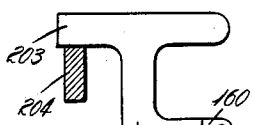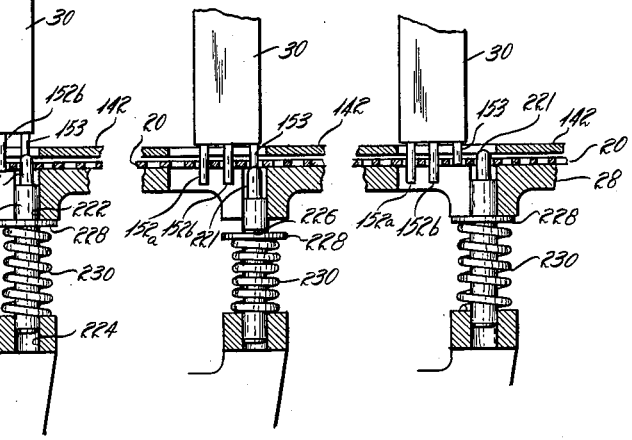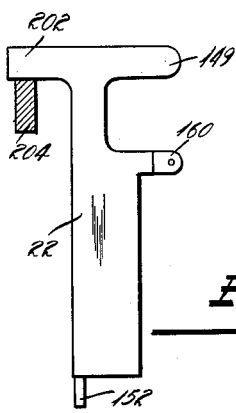

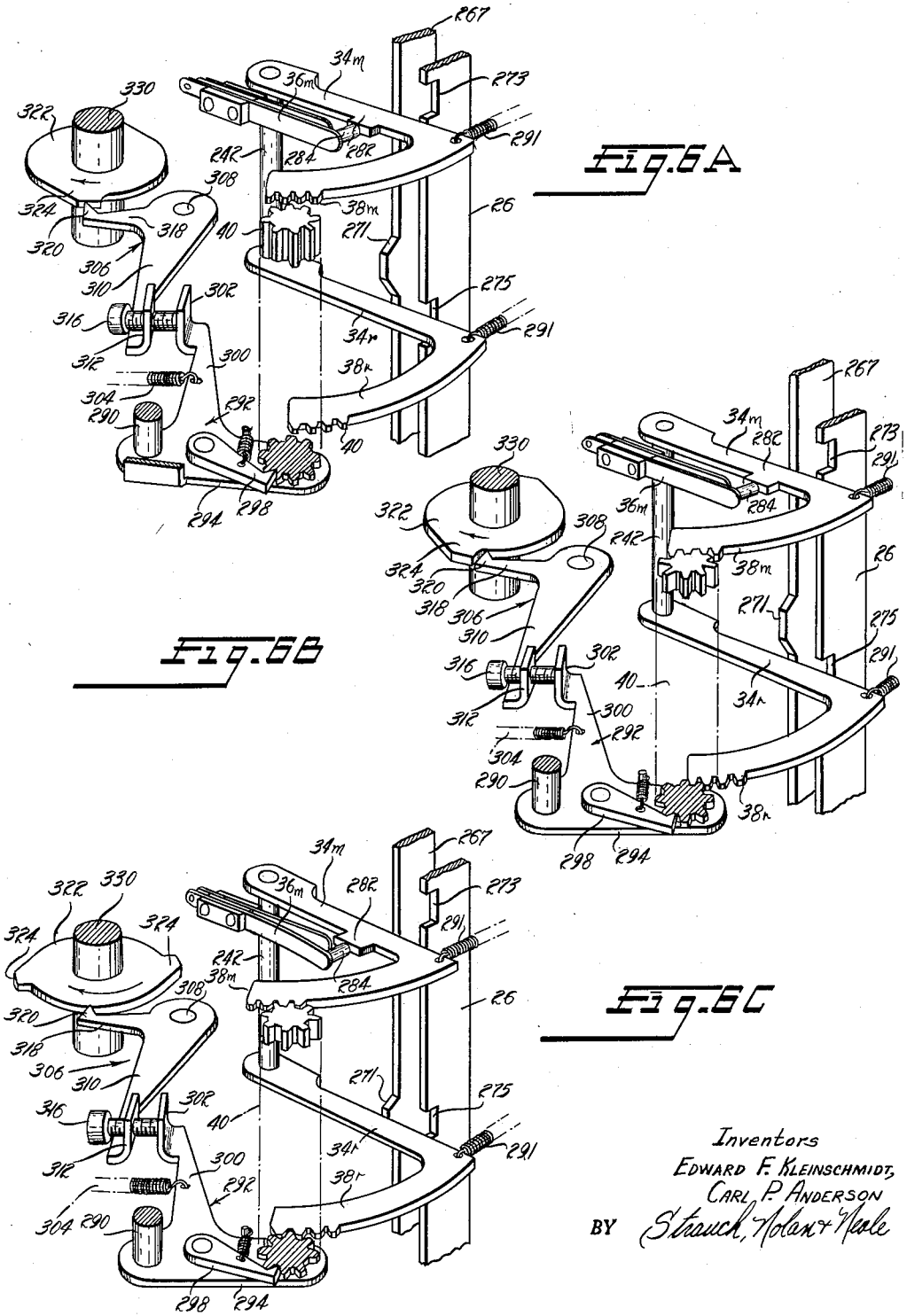

Inventors
EDWARD F. KLEINSCHMIDT,
CARL P. ANDERSON
BY Strauch, Nolan & Neale

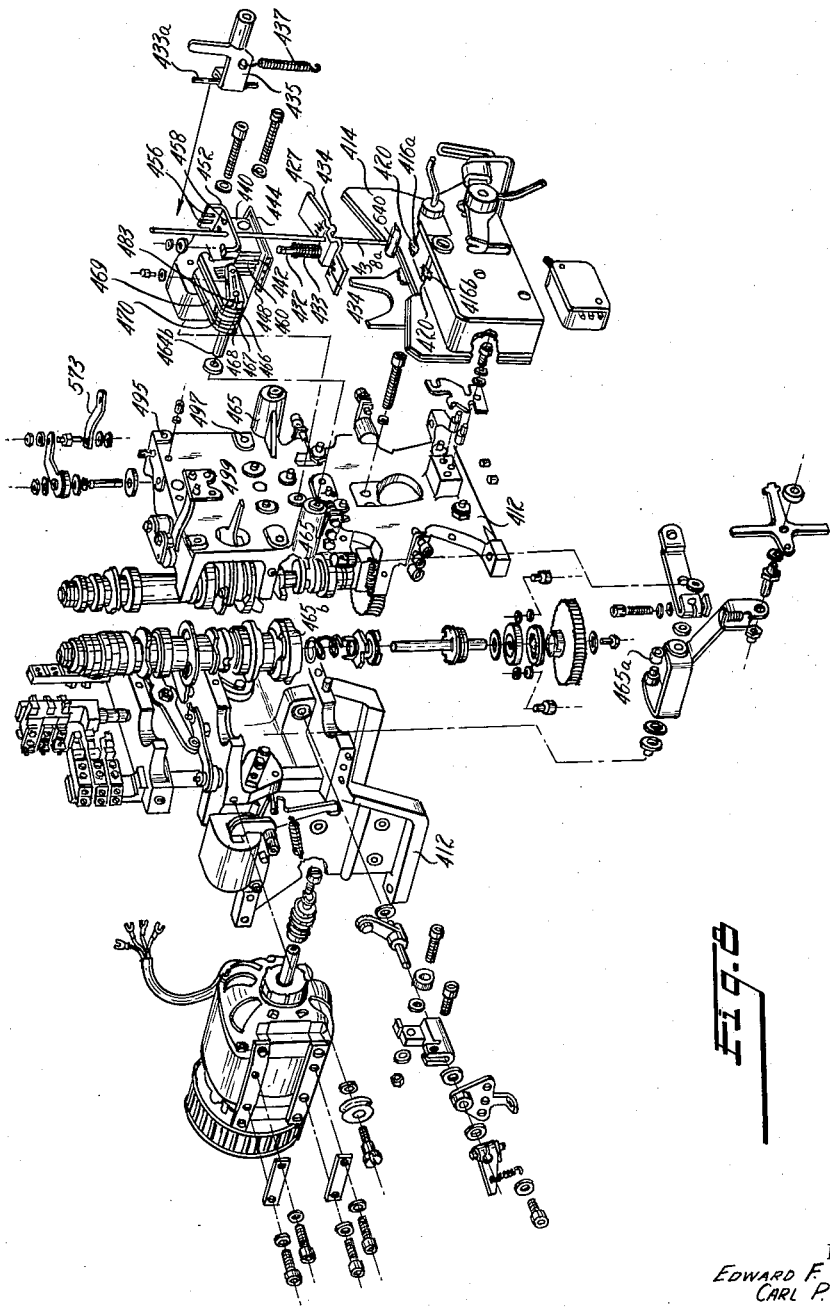

United States Patent Office 2,982,817
Patented May 2, 1961

2,982,817

TAPE CONTROLLED TRANSMITTER

Edward F. Kleinschmidt, Wilmette, and Carl P. Anderson, Evanston, Ill., assignors to Smith-Corona Marchant Inc., a corporation of New York Filed July 12, 1956, Ser. No. 597,381

34 Claims. (Cl. 178—17)

The present invention relates to tape controlled transmitting devices, and more particularly to improvements in tape controlled transmitters in which a message including destination indicative data recorded on a tape may be automatically routed and transmitted to such destination under tape control.

The primary object of the present invention is to provide a tape controlled transmitting device which is operative to detect the presence of message destination indicative signals recorded on a tape and to produce electrical signals indicative of such message destination to control the establishment of a communication channel from the transmitter to the destination, and to produce a series of time sequential signal groups indicative of the entire message including a destination indicative signal for transmission over such established communication channels.

A further object of the present invention is to provide a tape controlled transmitting device embodying a first tape sensing and decoding unit operative to detect the presence of message destination indicative signals and to produce electrical signals indicative of such destination for controlling the establishment of a communication channel from the transmitter to such destination and a second tape sensing and decoding unit operative to sense portions of a tape which have been previously sensed by the first sensing and decoding unit to produce electrical signals indicative of the data recorded on the tape for transmission over the channel established under control of the first sensing and decoding unit.

A further object of the present invention is to provide a tape controlled transmiting unit embodying a tape sensing unit and a decoding unit controlled by the sensing unit and operative to produce time sequential electrical signals indicative of a unit of data sensed from a control tape during a tape sensing cycle subsequent to that in which the unit of data was sensed by the sensing unit whereby each unit of data sensed by the sensing unit may be utilized to control its subsequent transmission.

A further and more specific object of the present invention is to provide a compact tape controlled transmitting unit embodying first and second tape sensing and decoding units mounted in adjacently spaced back to back relation whereby a record tape may be fed through such sensing units, wherein the first tape sensing and decoding unit is operative to produce signals indicative of the data sensed during the cycle in which such data is sensed and wherein such second tape sensing and decoding unit is operative to produce electrical signals indicative of the data sensed during the sensing cycle following the sensing of such data by said second sensing and decoding unit.

These and other objects of the present invention will become more fully apparent by reference to the appended claims and as the following detailed description proceeds by reference to the accompanying drawings wherein:

Figure 2 is a front elevational view of the unit of Figure 1;

Figure 2A is a fragmentary view of the decoding mechanism of the unit of Figure 1;

Figure 3 is a fragmentary perspective view partially broken away illustrating the details of the sensing mechanism of the unit of Figure 1;

Figure 3A is a front elevational view of a sensing element of the sensing mechanism illustrated in Figure 3;

Figure 4 is a perspective partially phantom view of the sensing unit mounting structure of the unit of Figure 1;

Figure 1A:
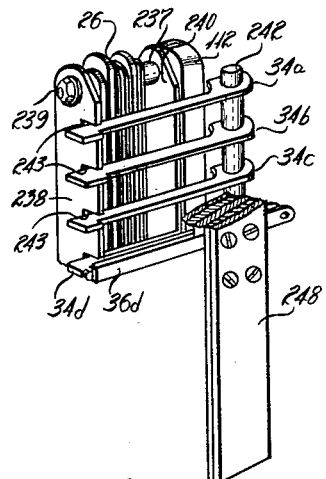
Figure 1A is a fragmentary perspective view of a portion of the structure of Figure 1.
Figure 1:
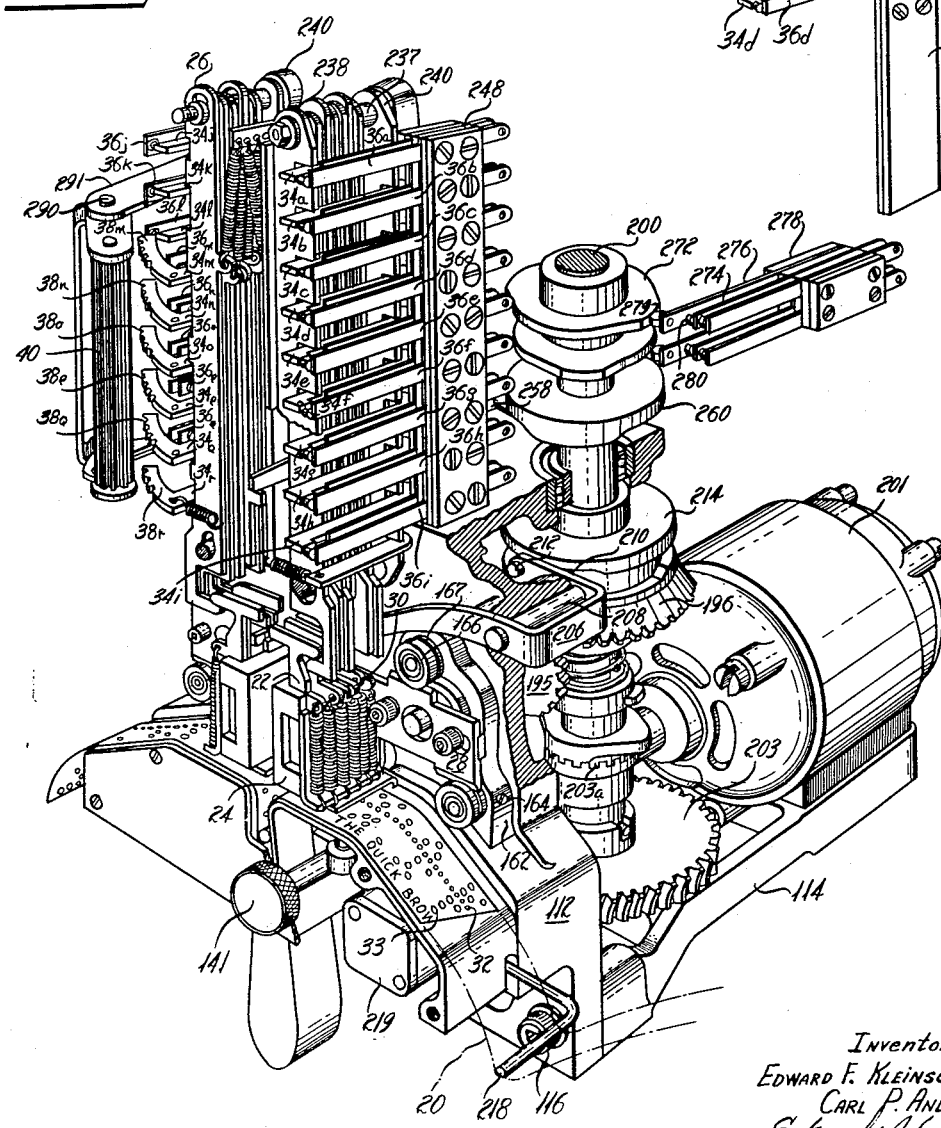
Figure 1 is a partially broken away perspective view of a tape controlled transmitting unit embodying the principles of the present invention and constituting a first embodiment of the present invention.
Figure 8A:
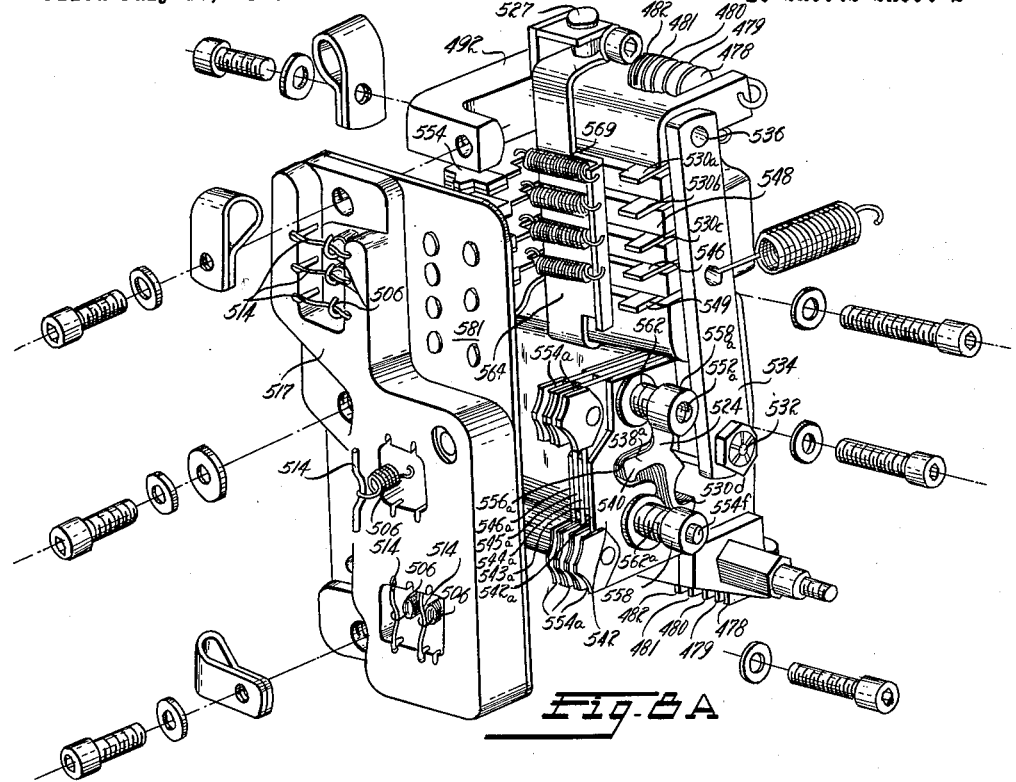
Figure 8B:
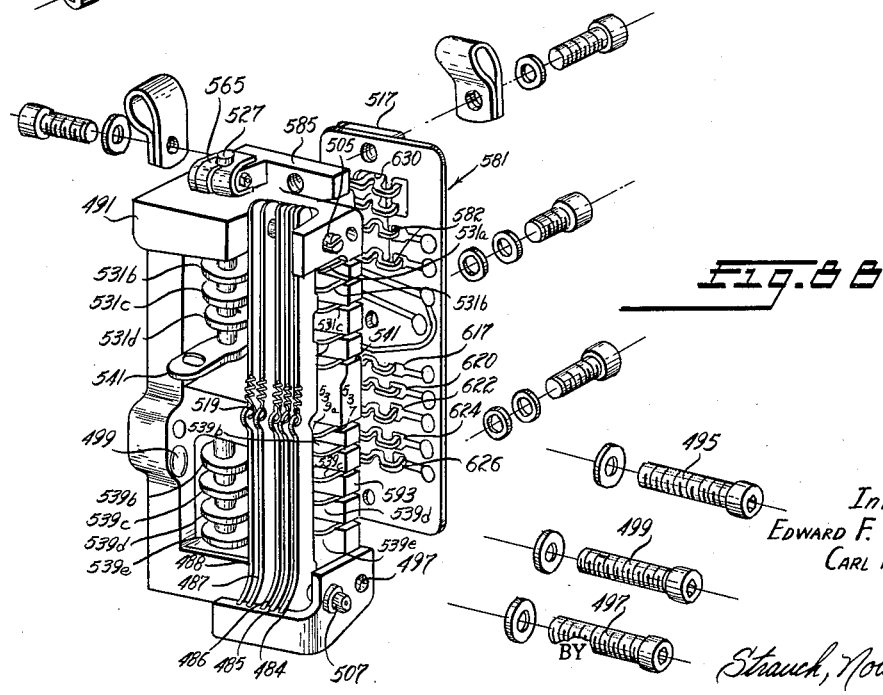
Figure 13:
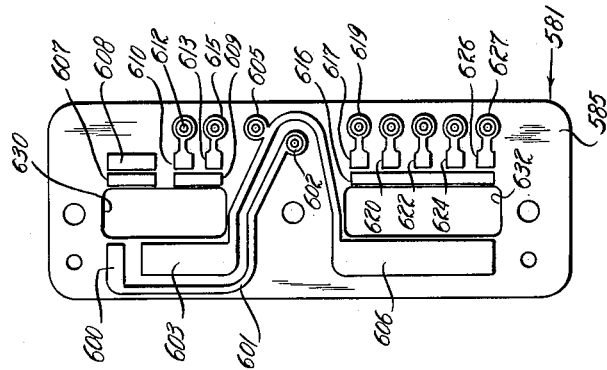
Figure 12:
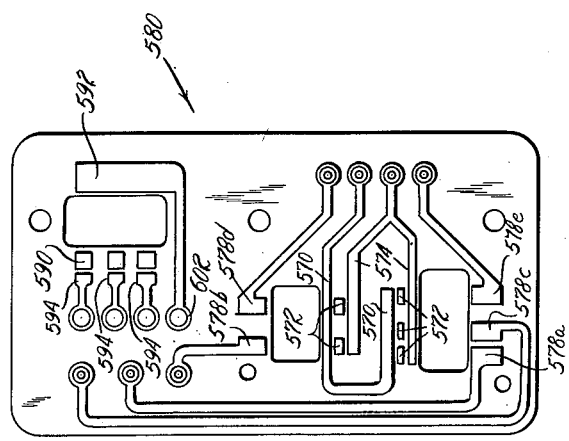
Figure 7:
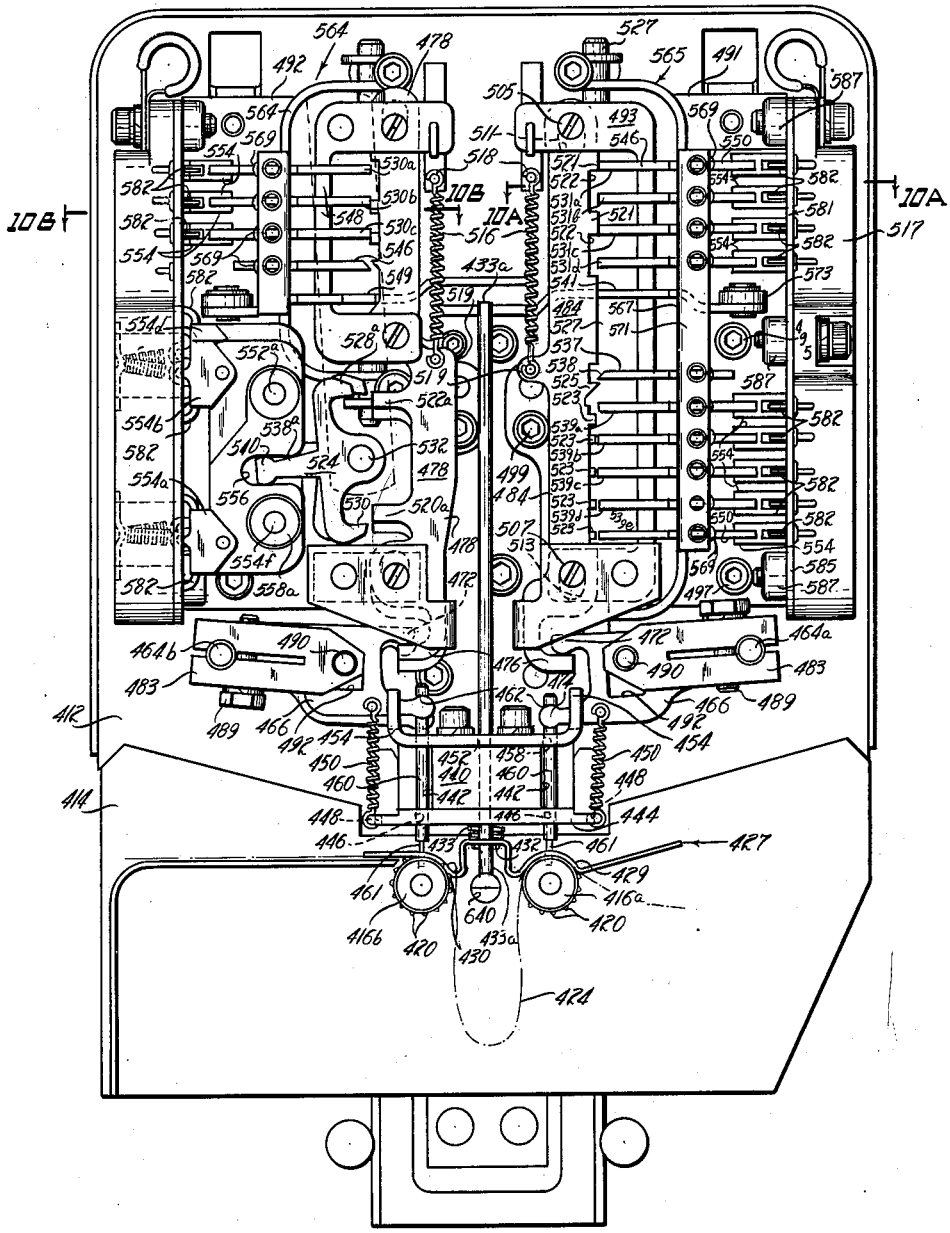

Figures 5A, B and C are fragmentary front elevational views of the tape feed mechanism of the sensing unit of Figure 3;

Figure 6A, B and C are fragmentary perspective views of the second decoding unit of the assembly of Figure 1 illustrating successive steps in the actuation of the one sensing cycle time delay mechanism;

Figure 7 is a front elevational view of a second tape controlled transmitting unit constituting a second embodiment of the present invention;

Figure 8 is an exploded view of the central portion of the unit of Figure 7;

Figure 8A is an exploded perspective view of the second decoding unit of the assembly of Figure 7;

Figure 8B is an exploded perspective view of the first decoding unit of the assembly of Figure 7;

Figure 9 is a perspective partially broken away view of the second sensing and decoding unit;

Figure 10A is a fragmentary sectional view taken substantially along the line 10A—10A of Figure 7;

Figure 10B is a fragmentary sectional view taken substantially along the line 10B—10B of Figure 7;

Figure 11 is a fragmentary perspective view of a portion of the decoding unit of the assembly of Figure 7;

Figure 12 is an elevational view of the commutator associated with the second tape sensing and decoding unit;

Figure 13 is an elevational view of the commutator associated with the first sensing and decoding unit; and Figure 14 is a schematic wiring diagram of the unit of Figure 7.

This device consists basically of a first and a second tape reading unit through which a perforated tape is fed in sequence. The perforated tape upon which this unit is intended to operate is perforated in Baudot code with a sequence of signals or signal groups which, in order, are indicative of: (1) the start of address information signal (Z); (2) the signals indicative of the address or designation of the unit to which the message is to be transmitted; (3) a start of message signal; (4) the message; and (5) an end of message signal.

The first tape sensing unit is adapted to sense each of the perforations in the tape and produce simultaneous electrical signals indicative in the Baudot code of the signal sensed. When it receives a start of address information signal, it establishes connections to set up relay trees in accordance with the subsequent signals indicative of the address or designation of the unit to which the message is to be transmitted. The relay trees control the destination of the entire message. Upon sensing of the start of address information signal by the second sensing unit, the circuits are completed through the relay trees to permit transmission of the message from the second sensing unit. Once the appropriate line has been established to a destination of a message under the control of the first sensing unit, the entire message including (1) through (5) will be transmitted in the form of time sequential signals to the destination as read by the second tape sensing unit.

General description

Referring to Figure 1, a perforated message tape 20 is guided to a group of five perpendicularly reciprocable sensing elements 22 of the first tape sensing unit which are carried in a comb member 24 which positions the sensing elements above the perforations of the tape 20. The sensing elements 22 are cam operated to move up and spring biased down in timed relation to the movement of the tape 20. On the downward movement only those of sensing elements 22 which are aligned with holes in the tape will go all the way down. Each of those that do will cause the associated ones of the group of code bars 26 to move down. The comb member 24 which carries the sensing fingers is mounted to a shuttle plate 28 which moves to and fro to cause the tape to be fed through the machine. The bottom of an element 30 similar to the sensing elements 22 and reciprocably mounted on comb 24 forms a claw consisting of three pins. This claw engages the feed perforations 32 of the tape 20 and pulls the tape 20 along as the shuttle 28 makes its forward stroke. On the return stroke of the shuttle 28, the claw element 30 and all of the sensing elements 22 are lifted free of the tape and are positioned above the next set of perforations.

The code bars 26 have lateral sliding engagements with the sensing unit elements 22 so that they will be moved down by corresponding downward movement of the associated sensing elements 22 but they will be unaffected by the lateral reciprocation of the shuttle 28. Lying along the sides of the group of code bars 26 are nine pivoted levers 34 which are spring pressed against the edges of code bars 26 by electrical contact springs 36a to i.

One of the top four bars 34a to d is dropped in upon sensing of "Z," a second for "LF," a third for "LTRS," and the fourth for "BLANK." For any other signal, these four bars 34a to d will not drop in. The lower five bars 34e to i are allowed to drop in permutatively in accordance with the permutative setting of the code bars 26 under tape control.

The above described device constitutes the tape reader side or first sensing unit of the complete machine. Adjacent and back to back to the tape reader mechanism is a similar mechanism which constitutes the second sensing unit or transmitting side of the complete machine. The sensing mechanism is identical and the difference lies in the addition of a transfer device to the code bars 26. The code bars 26 on this side have levers 34j to l and contacts 36j to l each for a particular character sensing similar to bars 34a to d and contacts 36a to d on the reader side and in addition six of the levers 34m to r have gear segments 38m to r projecting from them which engage a common pinion 40 when it is swung into mesh with all of them simultaneously.

For each setting of the code bars various ones of the five levers 34m to q will drop into the aligned notches and a sixth one 34r will always drop in. This causes the gear segments 38m to r to take different angular relationships with respect to the pinion 40 so subsequently when the pinion 40 is brought into mesh with all of the gear segments 38m to r and then rotated by the sixth segment 38r back to its normal or out of notch position, those ones of the segments 38m to q which are on levers 34m to q which have not dropped into notches will be rotated farther away from the sides of the code bars 26 than those that have dropped in. Those which have not dropped in when so moved open the associated ones of the normally closed contacts 36m to q. These contacts are connected to a sequential distributor for transmitting the code over a telegraph line.

As this above described mechanism does its transmitting during the cycle following that which sets it up, it can be seen that if certain predetermined characters are set up in the code bars the sending circuit could be broken so that a particular character would not be transmitted during the subsequent cycle.

Shuttle feed mechanism

Having reference to the perspective view of Figure 1 and the front elevation shown in Figure 2, the number 112 indicates a casting forming a vertical frame for the machine. This frame 112 is mounted to the front of a base plate 114 by suitable means, such as screws 116. Projecting forward of the frame 112 from a position near the bottom is a boss 118 extending across the width of the machine to form a mounting and sliding surface for the tape guide assembly 120. This tape guide assembly 120 is a casting having upwardly sloping guide surfaces 122 and 124 and leveled off coplanar top surfaces 126 and 128 to define a platform on which the sensing takes place. The tape guide casting 120 is held against boss 118 by the engagement between the vertically elongated slots 130, 131 and 132 (Figure 2) formed through the back of the tape guide assembly casting 120 and shouldered studs 134, 135, and 136 extending through them and into threaded holes of the boss 118. The tape guide casting 120 is guided for perpendicular movement by the engagement between the edges of the vertical portion of a tape hold down plate 138 (Figure 3) which is fixed to the front face of the boss 111 and a mating slot 140 in the rear surface of the tape guide casting 120. A mechanism (not shown) hand operated under control of the knurled knob 141 (Figure 1) is operative to raise or lower the tape guide assembly 120 to facilitate the placing in operative position and removal of the message tape 20.

As previously stated there are two tape sensing and signal transmitting devices comprising this invention and, as the sensing devices are identical in all material respects, only one will be referred to in this detailed description.

With reference to Figures 2 and 3, the apertured plate portion 142, which is a right angularly bent part of the plate 138, covers the tape 20 and serves to hold the tape down against the surfaces 126 and 128. Adjacent each end, this tape hold down plate portion 142 has six elongated holes 143a to f the purpose of which will be hereinafter explained. Directly above the right side of this plate portion 142 is the comb block 24 containing six vertical slots 148a to f (Figure 3). Slidably carried within each of the slots 148a, b, c, e and f is a sensing element 22 of the type shown in Figure 3A each having a sensing pin 152 at its foot for insertion into the perforations 33 of the tape 20. A tape feed element 30 (Figure 5) which is slidably received in slot 148d has three pins 152a, 152b and 153 at its foot to act as a claw for pulling the tape. The right hand pin 153 of this group is shorter than the other two for a reason to be fully explained.

Rigidly attached to the right side of the block 24 is a plate 154 (Figure 3) which has at the bottom a right angularly bent edge containing six holes 156 for attaching the lower ends of the springs 158. The other ends of the springs 158 are attached to the projections 160 of the five sensing elements 22 and the tape feed element 30. These springs 158 bias the elements 22 and 30 downwardly. The plate 154 holds the elements 22 and 30 within the slots 148a to f of the block 24. This whole sensing mechanism is a unit which is mounted for lateral reciprocation in a manner which will now be described.

Projecting forward from bosses 162 (Figure 1) of the frame 112 and fixed thereon at each side of the sensing mechanism are three posts 163 (Figure 2) each of which is retained in the bore through the bosses 162 in which it is mounted by a set screw 164 (Figure 1). Each of these posts 163 carries a roller 166 constructed of a standard ball bearing with a V-groove 167 ground in the periphery of its outer ring. Each of these bearings 166 is retained on the associated post 163 by the enlarged head of 168 thereof (Figure 4). The shuttle member 28 consisting of a flat metal plate formed with V-shaped track sections, one, 172, at the midpoint of its upper edge and two, 174 and 176, on the lower edge, rides in the grooves 167 of the rollers 166 and thus has rolling motion in a horizontal direction. The block 24 (Figure 3) carrying the sensing and tape feed elements 22 and 30 hereinbefore described is attached to this shuttle plate 28 at its left end by screws 178 (Figure 4) from the back.

With reference to Figure 4 it may be seen that there are two L-shaped stops 180 and 181 projecting rearwardly from the plate 28. These stops 180 and 181 have threaded holes 182 and are held to the back of the plate 28 by screws 184 which pass through longitudinally extending slots 186 of the plate 28. The stops 180 and 181 are adjustable in a horizontal direction and are prevented from turning by being recessed in a longitudinally extending groove 188 in the back of the plate 28.

Mounted on the stub shaft 190 and positioned to revolve between stops 180 and 181 is a ball bearing 192. This bearing 192 is pressed onto an eccentric projection 194 of the end of the shaft 190 so that the turning of the shaft 190 will cause the bearing 192 to wobble, and due to its being confined between the stops 180 and 181 of the shuttle plate 28, the shuttle plate 28 will oscillate horizontally. In the adjustment of the stops 180 and 181, a few thousandths of an inch clearance is allowed between the stops and the ball bearing outer ring, thus the bearing 192 will be free to roll on one or the other of the adjacent faces of the stops 180 and 181 as the bearing makes its off center gyration.

The shaft 190 is journalled in the frame 112 and a short distance behind the frame 112 (Figure 1) it terminates in a bevel gear 195 which meshes with a bevel drive gear 196 of the main vertical drive shaft 200. There are two such drive shafts; one, 200, at the right side of the machine, and a second 330 (Figures 6A to 6C) at the left side of the assembly in spaced parallel relationship to the shaft 200. An electric motor 201 is mounted to the base 114 and has worm gear engagement with a worm wheel 203 fixed on the drive shaft 200 and with a similar worm wheel on the drive shaft 330 to drive shaft 200 in a counterclockwise direction as viewed from above and the shaft 330 at the opposite side in a clockwise direction. Shafts 200 and 330 are selectively connected to the associate worm wheel 203 by a tooth clutch mechanism 203a as illustrated in Figure 1.

The above described mechanism provides the lateral reciprocation of the sensing and tape feed elements 22 and 30. Vertical reciprocation of the sensing elements 22 and feed element 30 is accomplished in the following manner. The top of each sensing element 26 and of the feed element 30 are T-shaped (Figures 3A and 5A) with extensions 202 and 203 engaged by a forwardly extending bail 204 which is a part of the lever 206. Lever 206 is U-shaped and is mounted upon a pivot post 208 journalled in a boss 209 of the frame 112. The rear extension 210 (Figure 1) of this lever 206, lying behind the frame 112, has a roller 212 (Figure 1) at its end and this roller 212 is confined in a captive cam 214 which is mounted on and rotates with the shaft 200. Turning of the cam 214 will cause the lever 206 to be oscillated up and down, which in turn will raise and lower the sensing elements 22 and feed element 30. The timing is such that when the shuttles 28 are in their extreme right hand positions, the sensing and tape feed elements 22 and 30 will be dropped and when the shuttles 28 are in their extreme left hand positions, the sensing and tape feed elements 22 and 30 will be raised.

Tape feed

Feeding of the tape is accomplished in the following manner. As previously mentioned, the tape feed element 30 (Figures 5A–C) has three pins 152a, 152b and 153 on its foot for engaging the feed perforations 32 of the tape 20. The cycle of operation is: first, dropping of the sensing and tape feed elements 22 and 30, second, movement to the left of the shuttle 28 which carries all the sensing elements 22 and feed claw 30 with it; third, raising of the sensing and tape feed elements 22 and 30; and fourth, return of the sensing and tape feed elements 22 and 30 with the shuttle 28 to the right hand position while elements 22 and 30 are disengaged from the tape 20.

As there are various mechanisms tending to move the tape 20 in one direction or another, for instance, a take-up reel (not shown) tending to pull the tape 20 to the left, and tight tape indicating arm 218 (Figure 1) associated with an electrical switch 219 tending to pull the tape 20 to the right, it is necessary to provide a means for holding the tape 20 in correct position during the part of the feeding cycle when the sensing elements 22 and the feed claw 30 are disengaged from the tape perforations 33 and 32 respectively.

Referring to Figure 5A, it will be seen that directly underneath the short pin 153 of the feed claw 30 when the fed claw is in its right hand position there is mounted underneath the sensing surface 126 a cylindrical column 220 slidably mounted in two bearings 222 and 224. The column 220 has an annular groove 226 directly underneath the bearing 222 into which is mounted a snap washer 228 which forms an abutment for a coil spring 230 which surrounds column 220 and is compressed between the top of the bearing 224 and washer 228. Spring 230 pressing against the washer 228 resiliently biases column 220 upwardly, the upward limit position of the column 220 being established by abutment between washer 228 and hte bearing 222. At the top of the column 220 and extending above the surface 126 is a pin 221. As previously mentioned, the pin 153 of the feed claw 30 is somewhat shorter than the other two 152a and 152b. When the shuttle 28 is in its right hand position (Figure 5A), the feed claw 30 is raised by the bail 204, the holding pin 221 is projecting up through a feed perforation 32 of the tape 20 preventing its movement. The first operation that takes place is the dropping of the sensing elements 22 and the feed claw 30 to the position shown in Figure 5B. The sensing elements 22 are spring pressed against the surface of the tape and those pins 152 that find holes 33 pass on through to set a group of permutation bars 26 to be hereinafter completely described. The three pins 152a, 152b and 153 of the feed claw 30 will pass on through the holes 32 and the feed claw 30 will be lowered far enough to cause the short pin 153 to press the holding pin 221 down below tape 20. The shuttle 28 then moves to the left carrying the sensing elements 22 and feed claw 30 with it. As the pins 152a, 152b and 153 of the feed claw 30 plus those sensing pins of the sensing elements 22 which have found holes 33 are in positive engagement with the tape 20, the tape 20 will be moved to the left during this movement of shuttle 28. As soon as the short pin 153 of the feed claw 30 has moved a short distance, it will slip off the holding pin 221 and the holding pin 221 will be sprung up against the bottom surface of the tape 20 at a point between two feed holes 32. Further movement of the shuttle 28 to the left will bring the next feed hole 32 directly above the holding pin 221 to permit it to spring up through the aligned hole 32 and thus hold the tape in this new position (Figure 5C).

Decoding mechanism

Directly above the sensing unit is a group of slidably mounted code bars 26 (Figures 1 and 2) each one of which has a laterally projecting arm 232 which extends beneath and slidably engages a laterally projecting arm 149 of the corresponding vertically aligned T-shaped sensing element 22. The ends of the code bars 26 are notched at 234 and 236 and are mounted for limited vertical movement relative to frame 112 on posts 235 and 237 received within notches 234 and 236 respectively and fixed to the frame 112. There are five of these bars 26 slidably interposed between a front guide plate 238 and a rear guide plate 240 mounted in fixed parallel spaced relation on the posts 235 and 237. A lock nut 239 at the end of each post 235 and 237 holds the complete code group in assembled relation.

Along the right side of the upper portion of the code bars 26 of the right hand code bar group are cut-away sections 241 so disposed that for four of the various permutated arrangements of the bars, each bar 26 being capable of two positions, there will be one and only one position where the cut-away sections 241 will line up transversely for a purpose as will now be described. Pivoted on a vertical shaft 242 (Figure 1A) at the rear of the rear guide plate 240 and guided in aligned notches 243 in plates 240 and 238 are a series of nine levers 34a to i. The upper four levers 34a to d cooperate respectively with the four positions of alignment of notches 241 to that each of the four possible line up notch positions of the code bars 26 is associated with a different one of the upper four levers 34a to d. In the preferred embodiment, the cut-away sections 241 are so spaced that one of the upper four levers 34a to d will drop in when the permutative arrangement of the code bars 26 is indicative of the signal "Z"; a second for the signal "LF"; a third for the signal "LTRS"; and a fourth for the signal "BLANK." Each of the levers 34 is spring biased toward the code bars 26 by an associated electrical spring leaf contact 36. Spring leaf contacts 36 are mounted in an insulating block 248 adjacent the lever pivot shaft 242. The two leaves 250 and 252 of the contacts 36 are sprung together to normally tend to hold the contact points closed. These contacts are normally held apart so long as the levers 34 are held away from the code bars 26, that is, not received in aligned notches across the code bars 26. When the code bars present aligned notches to a lever 34, the latter will drop in under the biasing force of the contact 36 and permit the contacts thereof to engage to close that electrical circuit. An additional bar 254 (Figures 1 and 2A) located vertically above the feed claw 30 has a series of V-shaped cam surfaces 255 adjacent each of the levers 34. This bar 254 is movable up and down under control of a lever 256 and is resiliently biased downwardly by a spring 257. Lever 256 engages a projection 258 on the back of the bar 254 and is operated by a cam 260 on the shaft 200. Lever 256 extends through and is pivoted upon the frame 112. The timing of the movement of the bar 254 is such that, immediately after the code bars 26 have been set, the bar 254 will be lifted from the position shown in Figure 2A to drop all of the levers 34 off the V-shaped cams 255 of the bar 254 and all the levers 34 will come up against the profile of the code bars 26.

After an electric pulse has been passed through the contacts 36 which have been permitted to close and before the code bars 26 are moved to the next permutated positions, the bar 254 is returned to its lower position to cam all of the levers 34 away from contact with the code bars 26 so the code bars 26 are free to slide to their next positions. An auxiliary lever 262 at the bottom of the group of levers 34 is provided with a spring 264, attached between plate 238 and bar 262, which holds the bar 262 against the sides of the code bars 34 and the universal bar 254. Small V-shaped notches 263, one for each of the two positions of the code bars 34 and the universal bar 254, form a detent with the bar 262 for retaining the code bars 34 and the universal bar 254 in their set positions.

All of the code bars 26 are biased upwardly by springs 266 (Figures 1 and 2) attached to projections 268 of their rear surfaces and to a post 270 of the frame 112. Upon release of extensions 202 of sensing elements 22, these springs 266 are overpowered by the springs 158 of the sensing unit, spring 266 being just strong enough to overcome the detent force of the bar 262 in the notch 263.

Mounted upon shaft 200 at the right side of the machine is a cam 272 and mounted alongside the cam 272 and parallel to the shaft 200 is an electrical contact pair 274 similar to the contacts 36 of the code bars 34. These contacts 274 have a leaf spring 276 mounted in the same insulating block 278 as the contacts 274 and the end of this spring 276 has a rounded knob 279 of tungsten or similar hard material which is in position to be periodically struck and pressed outwardly by cam 272. The contacts 274 have a buffer 280 which presses against the back of the spring 276. Thus when the cam 272 moves the spring 276, the contacts 274 will be closed. Contacts 274 are timing contacts common to all of the contacts 34a to i. Mounted on cam shaft 330 at the left of the machine is a series of cams similar to the cam 272 individually coacting with a like series of contact pairs similar to the contacts 274. An individual one of these contacts is connected in series circuit relation with an individual one of each of the contacts 36m to q to provide individual differentially timed electrical impulses to those contacts and a further one of these contacts is connected in common to contacts 36j, k and l to provide a simultaneous signal to those three contacts.

Contacts 36e to i of the code bars 26 are allocated to the five pulses of the standard Baudot code and contacts 36a to 36d close or open individual circuits when the characters "Z," "LF," "LTRS," and "BLANK" are read.

The description thus far given has been primarily for the right hand side of the complete machine. This right side is the reader side and is utilized for reading the address of a message and, through associated equipment, seeking an idle line to the required destination and also controls other electrical circuits. There are various other duties performed by this reader side but as they are outside the scope of this invention they will not be dealt with here. The adjacent side of the machine is the transmitter side and its main function is to transmit the message after the reader side through associated relays has connected it to the proper outgoing line.

The transmitter side is generally the same as the reader side except as to the form of the code bar contacts and operating mechanism. In the preferred embodiment of this invention, the mechanical form of the code is transferred to electrical form in two ways so that transmission of certain characters through contacts 36j, k and l will take place during the same cycle that sets it up under tape control in the code bars and time sequential transmission through contacts 36m to q of all characters takes place during the cycle following that which sets it up. Electric pulses through contacts 36j, k and l for certain characters are formed exactly as they are through contacts 36a to d from the reader side but the method for time sequential transmission of all characters of the code through contacts 36m to q during the following cycle will now be described.

This mechanism will be seen at the left side of the machine adjacent the code bars 26. With reference to Figures 1, 2 and 6 the mechanism consists of levers 34m to q corresponding to the levers 34e to i which may drop into notches of the code bars 26. These levers have gear segments 38m to q respectively projecting leftwardly from their outer ends and these gear segments 38m to q will engage a common elongated pinion 40 pivotally mounted to a bracket 291 of the frame 112. Referring to Figures 6A to 6C, at the right side may be seen two vertically disposed bars 26 and 267 which have sliding motion in an up and down direction. The bar 26 is one of five code bars and the bar 267 acts as a carrier for a cam lobe 271. The bar 26 has two notches 273 and 275. The notch 275 is long enough to allow the drop-in-bar 34r to move to the right when the bar 26 is in either an up or down position. The notch 273 will fall under the drop-in-bar 34m only when the code bar 26 is in its down or marking position. Each drop-in-bar 34m to r has a gear segment 38m to r extending to the left and they are all pivoted on the shaft 242. The drop-in-bars 34m to q each have a projection 282 which acts against the buffer 284 of the associated normally closed pairs of spring contacts 36m and 36q. The lower drop-in-bar 34r has no electrical contact associated with it.

At the lower left of each of Figures 6A to C is a vertical shaft 290 which is journalled in the bracket 291 of the frame 112 (Figure 1) and pivoting upon the shaft 290 is a bell crank 292. The bell crank 292 has an integrally formed upper arm (Figures 1 and 2), which with the lower arm 294 form a journal for the elongated pinion 40. Pivotally mounted on the arm 294 is a pawl 298 which engages the pinion 40 and prevents its turning in a clockwise direction as viewed from above. The other arm 30 of the bell crank 292 has an upturned end 302 and a spring 304 which imparts a counterclockwise moment to the bell crank 292.

Directly behind the bell crank 292 is another bell crank 306 pivoted at 308. Its forwardly extending arm 310 has an upturned portion 312 through which is formed a threaded hole carrying an adjusting screw 316. A leftwardly projecting arm 318 of the bell crank 306 has at its end a cam follower 320 which rides on the cam 322 and is moved forward and back by the diametrically arranged cam lobes 324. The cam 322 is mounted on and turns with the vertical shaft 330 which is a duplicate of the shaft 200 at the right of the machine in Figure 1.

Operation of the above disclosed mechanism now follows in sequence: In Figure 6A, the code bar 26 is in its up position having sensed no hole in the tape. The electrical contacts 36m are closed but with no current flowing. The cam follower 320 is on the high part 324 of the cam 322 and the end 312 of the bell crank 306 is in its right hand position. Through the engagement of the adjusting screw 316 with the end 302 of the bell crank 292 the latter is turned to its forward position. The pinion 40 is thus turned out of mesh with the gear segments 38m to r releasing them to be pulled to the right by the springs 291. The drop-in-bar 34r has fallen into the notch 275 and the bar 34m is resting against the edge of the code bar 26. Thus the gear segments 38m to r of the bars 34m to r have different angular positions with respect to the pinion 40.

Now with reference to Figure 6B, the cam follower 220 has dropped off the cam lobe 324 resulting in leftward movement of the end 312 and also the same movement of the end 302 of the bell crank 292. This movement has brought the pinion 40 into engagement with the gear segments 38m to r and the mechanism is ready for the transfer operation.

Having reference to Figure 6C, the bar 267 has been forced into its lower position which in turn has caused the cam lobe 271 to press out the drop-in-bar 34r. This clockwise turning of the bar 34r will turn the pinion 40 counterclockwise and, as the upper bar 34m has its gear segment 38m also in mesh with the pinion 40, the bar 34m will be turned an amount equal to the turning of the bar 34r. This new position of the bar 34m will cause the projection 282 to force apart the contacts 36m so that when subsequently a current pulse is sent to the contact 36m the circuit will not be completed for that particular drop-in-bar.

As soon as the bar 34r has been forced to the extreme left hand position, the bar 267 will return to its raised position, and the code bar 26 will assume its next coded position.

*Second embodiment*

A second embodiment of this invention is illustrated in Figures 7 to 14. As in the first embodiment, it comprises two tape sensing units through which a conventionally perforated paper tape is fed seriatim. For each message to be transmitted, the tape is perforated with signals indicative of: a start of address signal, address data indicative of the destination of the message, a start of message signal, the message, and an end of message signal. Upon the sensing of a start of address signal, the first sensing unit is operative to control the setting up of associated relay tree circuits in accordance with the subsequently sensed address indicative signals to establish a communication channel to the destination of the message. Upon the sensing of a start of address signal by the second sensing unit, that unit is operative to transmit that signal and all subsequently sensed signals of the message to and including the end of message signal in time sequential signal groups to the destination over the transmission channel established by the first sensing unit.

*Sensing mechanism*

In reference to Figure 7 which is an alternative mechanism for performing the reading and transmitting functions of the invention, the number 412 indicates a casting forming a vertical front frame for the machine. As this machine comprises two similar sensing units, like parts carry the same reference characters.

Mounted to the front of the casting 412 is a plate 414 rotatably mounting in suitable bearings the two tape feed drums 416a and 416b for the first and second sensing units respectively. Each drum 416 has a plurality of peripheral projections 420 equally spaced circumferentially by a distance equal to the longitudinal spacing of the feed holes 422 of the tape 424 (Figure 9). Each drum 416 is formed with five annular grooves 426 (Figure 9) axially spaced along the circumference a distance equal to the lateral spacing of the code holes 428 of the tape 424. Grooves 426 permit passage of sensing pins through holes 428 during tape sensing operations. The projections 420 constitute a sprocket and engage tape feed holes 422 to move the tape 424 to the left as viewed in Figures 7 and 9 as the drums 416 are independently intermittently rotated. The drums 416 are turned independently and intermittently at the specified transmission speed by a pawl and ratchet mechanism (not shown).

Mounted over the two drums 416 is a tape guide plate 427 (Figure 7) having arcuate sections 429 and 430 which conform to the circumference of the drums 416a and b. Plate 427 is mounted for limited vertical movement on a post 432, being resiliently biased toward the drums 416 by a spring 433 to hold the tape 424 on the sprocket teeth 420. A longitudinally extending slot 434 (Figure 8) is formed in the plate 427 in alignment with the teeth 420 at sections 429 and 430 to allow clearance for the teeth 420 as the drums 416 rotate. Above the plate 427 (Figures 7 and 8) and fastened to the casting 412 is a sensing pin mounting block 440. Block 440 has five half round vertical sensing pin guide channels 442 in the opposed end faces thereof. A plate 444, which is mounted on the bottom of the block 440, is formed with pin guide holes 446 (Figures 7, 8 and 9) in alignment with the channels 442. The opposite edges of plate 444 (Figure 9) are formed with holes 448 for receiving the ends of the springs 450 which, as will appear presently, resiliently bias the sensing pins toward tape 424. Mounted on top of the block 440 is a plate 452 having upturned edges 454 formed with code bar operating lever guide slots 456, one in alignment with each of the sensing pin guide channels 442. Plate 452 is formed with holes 458 in alignment with the channels 442 of the block 440 and sensing pin guide holes 448. The whole assembly of block 440 and plates 444 and 452 is registered with the code hole positions of the tape 424, the guide channels 442 being parallel and substantially perpendicular to the axes of drums 416.

Guided in channels 442 by the lower holes 446 and the upper holes 458 at each end of block 440 is a group of five cylindrical tape sensing pins 460 having smaller cylindrical sensing portions 461 (Figure 9) at their lower ends of such diameter as to pass easily through the code holes 428 of the message tape 424. The top of the sensing pins 460, where they project above the upper guide plate 452, are formed with transverse notches 462 cut into the sides to be engaged by extensions of the code bar operating levers 466 as will now be described.

Projecting forwardly from the casting 412 are two stub shafts 464a and 464b, one of which (464b) can be seen in perspective in Figures 8 and 9. These shafts 464 turn freely in bearings 465 (Figure 8) of the casting 412 and each has at its rearward end a cam follower 465a associated with a cam 465b to impart a few degrees of oscillatory motion to the shafts 464a and 464b. Pivotally mounted on each of the shafts 464a and 464b is a group of five parallel code bar operating levers 466 to 470 (Figure 7). The inside ends of these levers have upper extensions 472 and lower extensions 474. The extensions 474 are guided in slots 456 and have circular ends which fit closely within the notches 462 of the sensing pins 460 to form an operative connection therebetween. The upper projections 472 of levers 466 to 470 each have arcuate lower surfaces which rest upon an outwardly extending foot 476 of an associated one of the code bars 478 to 482 and 484 to 488. A sensing pin biasing spring 450 is fastened between each of the levers 466 to 470 and a spring hole 448 of the lower guide plate 444 to give downward bias to the sensing pins 460 and the code bars 478 to 482 and 484 to 488.

At the ends of each of the stub shafts 464a and 464b is a member 483. Members 483 are clamped to the stub shafts 464a and 464b by pressure of the screws 489. The opposite ends of member 483 has press fitted posts 490 which extend through openings 492 (Figure 9) of each of the levers 466 to 470. When the shafts 464a and 464b have been rotated clockwise and counterclockwise respectively, the posts 490 lift and hold the levers 466 to 470 and the associated sensing pins 460 in their upper positions above the tape 424. The code bars 478 to 482 and 484 to 488 are resiliently biased upwardly by springs 516 with their feet 476 against the projections 472 of operating levers 466 to 470.

*Decoding mechanism*

This machine has two decoding mechanisms, one for the first sensing unit and one for the second. The right hand one will be described first in reference to Figures 7 and 8B. At the upper right of the machine is a casting 491 attached to the main casting 412 at spaced points 495, 497 and 499. The code bars 484 and 488 are monuted on casting 491 upon two posts 505 and 507 for vertical sliding movement between an upper "unselected" position and a lower "selected" position. The limits of vertical motion of the code bars 484 and 488 relative to casting 491 are defined by the coaction of posts 505 and 507 with the elongated slots 511 and 513 on the code bars 484 to 488. The code bars are individually biased upwardly to the unselected position by tension springs 516 each of which is attached between a hole in a tab 519 of the associated one of the code bars 484 to 488 at its midpoint and a common support 518 on the casting 491.

The right side of each code bar 484 to 488 is formed adjacent its top with square projections 521 and notches 522; near its midpoint with angular projection 525, and adjacent its bottom with a projection 523. The projections 521 and notches 522 are so located along the length of the upper portions of the code bars 484 to 488 that for each of four predetermined permutations of the code bars 484 to 488, the notches 522 will form a single channel across the five code bars, the vertical location of such channel being different for each of said predetermined permutations. In this particular embodiment, the notches 522 will form a channel adjacent the top of bars 484 to 488 as described when all of the code bars 484 to 488 are up or unselected. This is indicative of the "BLANK" code group. A second and slightly lower channel will be formed when all of the code bars 484 to 488 are down, or selected. This is indicative of "LETTERS SHIFT." The third and still lower channel is formed by the dropping of the second code bar 485 while all of the others are held up and is indicative of "LINE FEED"; and a fourth channel is formed by the dropping of the first code bar 484 and the fifth code bar 488 while the others are held up to indicate the letter "Z."

Immediately below the projections 521 and notches 522 on each bar 484 to 488 is an angular projection 525, projections 525 being in an identical position on each code bar. These projections 525 are utilized as latches for holding selected code bars 484 to 488 in their selected positions.

Below the angular projections 525 are five vertically spaced projections 523, one of which is located on each of the code bars 484 to 488 in a position to block a coacting mechanical element when the bars are in unselected positions. As will become apparent presently, these projections control electrical circuits in accordance with all code groups sensed to set up the relay trees hereinbefore referred to to establish the desired communication channel to the message destination under control of the address destination indicative data recorded in the tape 424.

Behind the code bars 484 to 488 is a vertical shaft 527 which is journalled in casting 491. Pivotally mounted on this shaft 527 are eleven vertically spaced bell cranks each with an arm projecting forward in a position to rest against the sides of the code bars 484 to 488. The four top bell cranks 531a to 531d are associated with the projections 521 and notches 522; the fifth bell crank 541 acts as a restoring lever for all of the bell cranks; the bottom five bell cranks 539a to 539e engage the projections 523; and the bell crank 537 acts as a latch lever to engage projections 525.

Having reference to Figure 10A, each of the bell cranks 531 and 539 has a forwardly extending arm 542 with a widened end 544 to slide within a slot 546 of a guide comb 593 (Figures 7 and 8B) which is part of the casting 491. The other arm 550 (Figures 10A and 11) of each of the bell cranks 531 and 539 has a T-shaped end 552 about which is pivoted a dielectric wiper carrier 554. Carrier 554 has top and bottom sections 556 and 558 (Figure 11) which are coupled by an integral bridge 560. A riveted pivot post 562 passes through the carrier 554 and the bell crank end 552 to form the complete assembly shown in Figures 10A and 11.

Operation of the bell cranks is effected in the following manner. Clamped to the shaft 527 (Figure 7) is a yoke or bail 565 which has a vertical edge 567 against which are biased all of the bell cranks 531, 541, 539 and 537 by springs 569 attached between the spring bracket 571 on yoke 565 and the rightwardly extending arms 550 of the bell cranks. The bell crank 541 has a link 573 pivotally attached at its outer end. Reciprocation of this link 573 by a cam mechanism (not shown) causes the bell crank 541 and the yoke 565 to turn, through their abutting engagement at the edge 567. Thus, once during each cycle, when the link 573 is pushed forward and the yoke 565 is turned clockwise as viewed from above in Figure 7, the other bell cranks 531, 539, and 537 will all attempt to follow the clockwise rotation of bail 565 due to their connection thereto by the springs 569. Bell cranks 531, 539 and 537 will rotate until they abut the edges of the code bars 484 to 488. With reference to the top group of bell cranks 531a to 531b, should there be a channel as previously explained, one of the bell cranks 531a to 531d will rotate until its arm 542 contacts the bottom of the channel and its commutator wiper carrier 554 will be moved forwardly.

This same above described action will cause each of the five bell cranks 539a to 539e to rotate toward the code bars 484 to 488 where the associated projections 523 will allow further rotation of the bell cranks 539 for each code bar 484 to 488 that has been lowered or selected.

Bell crank 537 is also released by the edge 567 of the yoke 565 after the code bars 484 to 488 have been selected. Its beveled face 538 will be pressed against the angular projections 525 on the code bars 484 to 488. Those code bars which have been selected will present their projections 525 below the arm of bell crank 537 to be latched in that position until the bell crank 537 is turned counterclockwise by the yoke 565.

The mechanical settings of the bell cranks are converted into electrical conditions by the coaction between a commutator 581 (Figures 8B and 13) and metallic wipers 582 (Figures 8B and 11) on the outer end of each arm 550 of bell cranks 531 and 539. As is best shown in Figure 13, the commutator consists of a flat dielectric strip 585 on the surface of which is printed a metallic circuit or contact arrangement. This commutator 581 is mounted to lugs 587 (Figure 7) of the casting 491 and lies in a plane perpendicular to the parallel planes of movement of the arms 550 of the bell cranks 531 and 539. At the top of the strip 585 (Figure 13) may be seen metallic segments 600, 607, 608, and 603 which make up one circuit. The segment 600, which is associated with the bell crank 531a, leads through the connector 601 to a terminal 602. The segments 607 and 608 are long enough to be common to the wipers 582 on bell cranks 531a and 531b. The segment 603 is long enough to accommodate the ends of the three wipers on bell cranks 531b, 531c and 531d. The segments 610 and 613, which are associated with bell cranks 531c and 531d are connected to terminals 612 and 615 respectively. The segment 609 is an isolated area for the following purpose. As the electrical segments are raised slightly from the surface of the plate 585, it is necessary to provide a surface at the same level for the electrically neutral position of the wiper 582. The two segments 609 and 610 are spaced closer than the width of the contact face of the wiper 582 to reduce the tendency of the latter to dip into the gap and wear the edges of the segments.

The lower half of the strip 585 contains another series of segments to work in conjunction with the lower five bell cranks 539a to 539e. At the left is an area 606 which is common to all of the wipers of bell cranks 539a to 539e and is connected to the terminal 605. On the right are five segments 617, 620, 622, 624 and 626 associated respectively with bell cranks 539a to 539e and each connected to a separate terminal. A neutral strip 616 is provided for the same purpose as segment 609 explained above.

Between the right and left groups of segments in both halves of the strip are cut-away portions 630 and 632 to allow passage of springs 506 which bias wipers 582 against commutator 585 (Figures 10 and 11). The metallic wipers 582 are mounted on each of the wiper carriers 554 as is shown in Figure 11 and each has two contact end faces 583 and 585a. The center portion 514 of the wiper 582 is U-shaped to fit around the bridge 560 of the carrier 554. Around the U-shaped section 514 is hooked the end of the spring 506. The other end of each spring 506 is hooked to a bar 514a which is held in position in notches of a heavy dielectric apertured backing plate 517 (Figures 7A and 10) for the commutator plate 584. This backing plate and the commutator plate are screwed to the projections 587 of the casting 491.

*Operation*

As the message tape 424 is stepped to the left by the intermittent turning of the drum 416, the code hole group is presented to the sensing pins 460. The first code group of a complete message is indicative of the character "Z," the start of address signal consisting of perforations in the tape in the first and fifth positions. Immediately following the halting of the tape in this position, the post 490 controlled by shaft 464a is dropped to release the five levers 466 to 470. This movement permits all of the sensing pins 460 to be pulled down by springs 450 against the tape 424 and the first and fifth sensing pins 460 to go down through the aligned perforations 428 into the annular grooves 426 of the drum 416. The first code bar 484 will be pulled down by the lever 466, the force of its spring 450 overcoming the opposed force of the associated spring 516 which tends to lift the bar 484. The fifth code bar 488 will be pulled down in a like manner. Immediately after the code bars 484 to 488 have been set in this manner, the cam actuated link 573 is pushed forward to turn the yoke 565 clockwise to release the ten bell cranks 531 and 539 and the latch lever 537. In the specific embodiment of this invention, the fourth from the top bell crank 531d is associated with the character "Z." Since a channel will be formed across the code bars at this position when the first and fifth code bars are dropped, bell crank 531d will be turned clockwise to cause the associated commutator wiper 582 to slide forward on the commutator 581. The top and bottom bell cranks 539a and e will also be turned clockwise to slide their wipers 582 forward. At the same time that the bell cranks 531 and 539 take their positions the beveled edge 538 of the latch lever 537 moves up against the angular projections 523 of the code bars 484 to 488 to latch them in the selected positions.

The sliding forward of the wiper 582 by bell crank 531d will cause its contact end 583 to be transferred from the metallic segment 609 to the segment 613 (Figure 13). The contact end 585a will be moved across the segment 603 which is wide enough to accommodate both positions of the contact 585a. The segment 613 is connected through the terminal 615 to electronic equipment and the segment 603 is connected through the terminal 605 and a timing cam controlled contact to a common positive source of electric current. After the wiper 582 has taken this new position on the commutator the electric current is applied. The sliding forward of the two wipers 582 of the code sensing group (bell cranks 539a and e) will cause their contact ends 583 to be transferred from the common neutral segment 616 to the segments 617 and 626 respectively. The contact ends 585a of the wipers 582 slide across the common segment 606 and subsequently when a current is applied individual simultaneously occurring electric pulses will be sent out through terminals 619 and 627 to the relay trees previously referred to.

In the specific embodiment of this invention an electrically closed circuit is provided for every sensing cycle of the machine except when either of the top two wipers 582 for "Blank" and "Letters shift," is shifted from contact with segment 607 to contact with segment 608. Thus it can be seen that when the wipers are in these positions a current can pass from the terminal 605 through the segment 603, through the second wiper 582 to the segment 607; through that segment and back through the top wiper 582 to the segment 600 and to the terminal 602. The movement of either of these two top wipers to the right will break the circuit to the segment 607 and consequently no current can flow.

The sensing pins 460 can be pulled up out of the code holes of the tape at any time after the code bars are set and latched. This is done by the clockwise turning of the clamp arm 487 on shaft 464a which raises the post 490 and lifts up the sensing pins 460. The feed drum 416 is then free to be turned to advance the tape 424 to its next code position under the sensing pins 466. While the tape is being advanced, the current is taken off the above described circuits; the link 573 is pulled back to cause the yoke 565 to turn counterclockwise and pull the bell cranks 531, 539 and 537 away from the code bars. The wipers 582 on bell cranks 531 and 539 will thus be moved back to their neutral positions and the latch arm of the latch lever 537 will release those code bars 484 to 488 which are down, which will then be pulled up by the springs 516. The machine will then be in readiness to sense the next code group and one cycle will have been completed.

Tape transmitter

The above described mechanism performs the reading and controls the message routing functions of this invention. Transmission of intelligence is performed by the similar contiguous mechanism which will now be described. Having reference to Figure 7, the message tape 424 after leaving the right hand drum 416a hangs in a loop and then passes over the left hand drum 416b. Between the two drums is a cylinder 640 attached perpendicular to the end of vertically extending rod 433a (Figures 7 and 8). The top of the rod 433a is fastened to an arm 435 on a toggle switch (not shown) and the downward pull of a spring 437 on the rod 433a and cylinder 640 will hold the switch in "On" position. When the tape loop becomes smaller due to the stopping of the right hand drum 416 and continued revolution of the left hand drum 416b, the rod 433a will be raised and the switch will be put in "Off" position to stop the left hand drum 416b.

The sensing mechanism for the "Transmitter Side" is identical to the "Reader Side" so that no further description is necessary. The code bar and decoding mechanism differs as follows. With reference Figures 7, 8A and 10B, the code bars 478 to 482 are mounted in the casting 492 which is similar to the casting 491 but having its comb section 548 only at the top. The yoke member 564 of this side is shorter than the yoke 565 but is otherwise the same. There are three bell cranks 530a, b and c at the top of this mechanism which read: "CARRIAGE RETURN," "LETTERS" and "Z" respectively. The fourth bell crank 546 is the latching member and the fifth bell crank 549 is the operating lever for the yoke 564. The printed circuit commutator 580 (Figure 12) with which the bell cranks 531a, b and c are associated is of the same construction as the commutator 581 but with different circuitry. As can be seen in Figure 9, the three top bell cranks 530a, b and c have their wiper ends 583 normally resting on the neutral segments 590. The wiper ends 585a rest on a common segment 592 which leads to the terminal 602 (Figure 12). Selection of any one of the above bell cranks 531a, b or c in the manner previously explained will slide the wiper carrier forward to cause its wiper to close a circuit between the common segment 592 and the associated one of the segments 594.

In order to be able to transmit all of the code signals that are sensed in the tape but to have them at all times under the control of the above three intelligence groups it becomes necessary to have the transmitting cycle follow the sensing cycle and this is accomplished in the following manner.

On the left side of each of the code bars 478 to 482 (Figure 9), between the guide posts 504 and 506a, are two projections 520a and 522a which are spaced to engage one or the other of the arms 528 or 530d of the T-shaped levers 524. These five T-shaped levers are pivotally mounted on the post 532 (Figures 8A and 9) which in turn is carried at the end of a transfer arm 534 which is clamped on the shaft 536 at the top of the machine. Each T-lever consists of three arms, the two 528 and 530d previously mentioned, which have rightwardly extending fingers and an arm 538a terminating in a circular tip 540. To the left of the T-levers are a group of five plates 542a to 546a one aligned with each of the five T-levers 524 and each having two elongated holes through which pass posts 552a and 554f mounted in the casting 492. A slot 556a in each plate engages the circular end 540 of each T-lever so that turning of the T-levers will cause the plates to slide vertically on the posts 552a and 554f. The plates are held on the posts by collars 558a and between these collars and the outside plate 542a are coil springs 562a which increase the friction between the plates to hold them in set positions. At alternate ends of each adjacent plate are wiper carriers 554a which are identical to the wiper carriers of the reader mechanism. These carriers engage wipers 582 to slide them one way or the other over the metallic segments of the commutator 580. This section of the commutator differs somewhat from that which was previously described in that there are three metallic segments 570, 572, and 574 (Figure 12) over which one end 585a of a wiper 582 may slide. The segment 570 is connected to a positive source of electric current, the segment 572 is neutral (for the purpose which was previously explained), and the segment 574 is connected to a negative source. The opposite pole of these switches are the larger segments 578a to e which will accommodate both positions of the wiper and are connected to a time sequential distributor. There is a distinct and electrically insulated segment 578 for each of the ends 583 of the five wipers but the segments 570 and 574 are common to the contact ends 585 of all the wipers.

Operation

Operation of this above disclosed mechanism will now be described. At the very end of the sensing cycle, the transfer arm 534 is swung to the right bringing the five T-levers 524 up against the projections 520a and 522a of the permutatively set code bars 478 to 482. The first three and the fifth code bars 478, 479, 480 and 482 being up, or unselected, for example will result in a counter-clockwise turning of the associated T-levers 524 (the fingers 528a will strike the projections 520a and the fingers 530d will pass below the projections 520a). The fourth T-lever will be turned clockwise as that code bar 481 is down and the fingers 528a will pass above the projection 522a while the fingers 530d will strike the projection 520a. The plates 542a, 543a, 544a and 546a will be correspondingly moved downward while the plate 545a will be moved upward. As soon as this setting of the plates has been completed the transfer arm 534 is swung to the left to free the code bars of the T-levers. The sensing cycle thus ends and the sensing mechanism either stops or begins a new cycle.

Sequential transmission of the conditions which have been set up on the commutator plate 580 takes place during the next cycle of the sensing mechanism and is performed by a distributor as shown in Figure 1 of the drawings and described in the specification for the original embodiment of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination in a record controlled transmitting device, a record strip controlled data transmission channel selector, a record strip controlled data transmitter, means for feeding a sensible record strip to said selector and transmitter seriatim, and means connecting said transmitter to said channel selector so that record controlled transmission will be accomplished on a channel selected by said record controlled channel selector.

2. A record tape controlled transmitter operable under control of a record tape embodying a start of data destination signal, data destination indicative signals, a start of data signal, data indicative signals, and an end of data signal; said transmitter comprising means responsive to data destination signals embodied by said record tape for controlling the selection of a data transmission channel to such destination, means operative in response to a start of data destination signal for controlling initiation of effective operation of said channel selection control means, and means for controlling transmission of all of said signals over the channel selected under control of said channel selection control means.

3. The transmitter defined in claim 2 wherein said channel selection control means and said effective operation initiation control means comprise a first tape sensing and decoding unit and wherein said transmission control means comprises a second tape sensing and decoding unit mounted in adjacent back to back relation to said first unit.

4. In a combined tape reader and telegraph transmitter, a pair of groups of elements for cyclically sensing the presence of recordations of a message tape, means under the control of one of said groups of elements for conditioning electric circuits corresponding to certain combinations of recordations on said tape during a first operating cycle, means under the control of a second group of said groups of elements for conditioning other electric circuits corresponding to certain other combinations of recordations on said tape during said first operating cycle, and means operative under the control of the same setting of said second group of elements and during the next succeeding operating cycle following said first operating cycle for transmitting signals indicative of the combinations of recordations on said tape sensed by said second group of elements during said first operating cycle.

5. In a telegraph transmitter, a plurality of elements for cyclically sensing the presence of permutated recordations on a control strip, first means under the control of said elements during a first operating cycle for conditioning electric circuits corresponding to certain combinations of recordations on said strip, and second means under the control of said first means for transmitting signals during a second and subsequent operating cycle indicative of all possible combinations of recordations on said control strip.

6. A telegraph transmitter comprising a plurality of elements for sensing the presence of permutated perforations of a tape, a plurality of permutation members under the control of said elements, a plurality of pivotally mounted gear segments operatively associated with said members, a pinion gear common to all of said gear segments, means for meshing said pinion gear with said gear segments while the latter are under the control of said members, means to rotate said pinion gear while it is in mesh with said gear segments to remove the latter from the control of said members while maintaining their controlled relationship, and means for converting this controlled mechanical relationship to transmittable electrical signals.

7. A telegraphic transmitter comprising a plurality of elements for engaging the various perforations of a coded tape, means under the control of said elements to transmit electrical signals in accordance with the code represented by said tape perforations, means for intermittently moving said tape, means to cause said elements to move in a rectangular pattern in timed relation to periodic forward movement of said tape, said rectangular pattern consisting of a tape engaging stroke, an advancing stroke, a tape disengaging stroke and a return stroke of said elements.

8. A telegraph transmitter comprising a plurality of elements for sensing the presence of perforations of a coded message tape, means under the control of said elements to transmit electrical signals in accordance with the code represented by said tape perforations, means to cause said elements to move in a rectangular path including a feed device invariably engaging said tape to effect a forward movement of the latter.

9. A telegraph transmitter as defined in claim 8 including retaining means for engaging, and preventing movement of, said tape when said elements and said feed device are disengaged from said tape.

10. A telegraph transmitter comprising a plurality of elements for sensing the presence of perforations of a coded message tape, mechanism under the control of said elements to transmit electrical signals in accordance with the code represented by the distribution of said tape perforations, a drive shaft, first means associated with said drive shaft to impart lateral reciprocating movement to said elements, second means associated with said drive shaft to effect vertical reciprocating movement of said elements, the timed relationship between the operation of said first and second means being such that the aggregate motion of said elements is a rectangular pattern.

11. In combination, a plurality of permutatively settable elements, means for setting said elements, means for detecting the permutative setting of said elements and for producing electrical manifestations of the detected element setting, and means operative in response to a single predetermined permutation of said elements for producing a single distinct from said electrical manifestations.

12. The combination defined in claim 11 wherein said elements are code bars.

13. The combination defined in claim 12 wherein said electrical manifestation producing means comprises a plurality of electrical switches one of which is associated with each of said code bars and a like plurality of switch actuators each operatively connected to one of said switches and actuated by one of said code bars.

14. In combination, first and second record tape sensing devices, means for feeding a record tape through said sensing devices seriatim, means operative under control of said second sensing device for producing signals indicative of each recordation on such a tape, and means operative under control of said first sensing device and responsive to certain predetermined recordations on such a tape for establishing a control effecting the signals produced by said second sensing device controlled means.

15. The combination defined in claim 14 wherein said second sensing device controlled means comprises a plurality of permutatively settable elements permutatively set by said second sensing device in accordance with each recordation sensed, a like plurality of electrical switches, and a cyclically operative transfer device operative to permutatively set said switches during each cycle in accordance with the permutative setting of said elements during the preceding cycle.

16. The combination defined in claim 15 wherein said plurality of switches comprise means defining a plurality of discrete fixed contact faces and a plurality of contact elements movable under control of said transfer means to electrically interconnect certain of said contact faces.

17. The combination defined in claim 16 wherein said transfer means comprises a plurality of plates mounted for movement between predetermined limit positions, said contact elements being mounted on said plates, and a like plurality of pivoted levers, each of said levers being associated with a distinct one of said permutatively settable elements and operatively connected to a distinct one of said plates, said levers being mounted for movement as a group between a first position in contact with said permutatively settable elements in which each of said levers are positioned in one of two positions in accordance with the setting of the permutatively settable element contacted and a second position remote from said permutatively settable elements in which said levers set and maintain said plates in one of their said two limit positions.

18. The combination defined in claim 14 wherein said feeding means comprises a sprocket at each of said sensing devices and means for independently intermittently driving said sprockets.

19. In a record tape controlled transmitter: a pair of groups of elements for sensing the presence of recordations of a message tape; each of said groups of elements comprising sensing pin mounting means having a plurality of sensing pin guide channels, a plurality of record tape hole sensing pins each with a transverse notch adjacent one end slidably disposed in said channels, a tape feed pin wheel drum having a plurality of annular grooves in its peripheral surface spaced apart to align with associated ones of said sensing pins and with the axis of said drum substantially in a plane including the axes of said sensing pins, a plurality of pivotally mounted independently movable sensing pin actuating members, each having two lever arm extensions, one of which is engaged in a transverse notch of an associated sensing pin, first resilient means biasing each set of said sensing pins and actuating members toward said drum, an intermittent cyclically operable link having a lost motion connection with all of said actuating members for engaging and shifting all of said actuating members and pins away from said drum against the resilient biasing force, and a plurality of two position code members, each of which has a connector portion adapted to be engaged by the other lever arm extension of an associated one of said actuating members for shifting of the code member by resiliently biased movement of the actuating member, second resilient means weaker than said first resilient means, biasing each of said code members in a direction opposed to the bias of said first resilient means and tending to keep said connector portions in engagement with said other lever arm extensions; means under the control of the code members of one of said groups of elements for conditioning electric circuits corresponding to certain combinations of recordations on said tape; and means under the control of the code members of the other of said groups of elements for transmitting signals indicative of all possible combinations of recordations on said tape.

20. In a record tape controlled transmitter as defined in claim 24, each of said code members having a portion with permutative notches, a latching portion and a portion with coded electrical circuit determining abutment means.

21. A transmitter as defined in claim 20 wherein said coded circuit determining abutment means comprise a single abutment lug on each code member located at a different position on each code member.

22. A transmitter as defined in claim 20 wherein said coded circuit determining abutment means comprise a pair of spaced abutment lugs located at the same position on each code member.

23. In a record tape controlled transmitter: a pair of groups of elements for sensing the presence of recordations of a message tape; each of said groups including a plurality of permutatively positionable code members cyclically positioned in accord with each recordation on a message tape, each of which code members has a portion with permutatively arranged notches, a latching portion and a portion with coded electrical circuit determining abutment means; means under the control of one of said groups of elements for conditioning electric circuits corresponding to certain combinations of recordations on said tape, and means under the control of the other group of said groups of elements for transmitting signals indicative of all possible combinations of recordations on said tape; each of said means under control of a group of said elements comprising a plurality of drop-in members adapted to engage the code members of the associated group, means biasing said drop-in members toward said code members, means associated with and adapted to engage said drop-in members to maintain them away from said code members and cylindrically operative to permit said drop-in members to be biased against said code members, and circuit controlling individual switch means associated with individual ones of said drop-in members rendered operative by the degree of movement of said individual drop-in members permitted by the permutative positioning of said code members.

24. A transmitter as defined in claim 23 wherein one of said drop-in members is a latch which cyclically engages latching portions on said code members to detain said code members in permutative position during the engagement of said drop-in members against said code members.

25. A transmitter as defined in claim 23 wherein said switching means comprises a printed commutator circuit having switch contact segments thereon, at least a portion of said drop-in members have a dielectric wiper carrier secured thereto, and a segment bridging wiper is carried by each said carrier and engages certain commutator contact segments to open or close said individual switch means in accord with the degree of movement of said drop-in members as determined by engagement with said code members.

26. A transmitter as defined in claim 25 wherein the drop-in members with carriers and associated switch components comprise a means for setting up special intelligence code signals, and said means under control of one of the groups of said elements further comprises a cyclically operative transfer assembly including a two position transfer arm mounting a plurality of two-position T-levers for individual pivoting movement, corresponding in number to said code members and shiftable between engagement and disengagement of associated T-levers with one or the other of two lugs on associated code members; and a code switch assembly comprising a printed commutator with switch contact segments thereon, a plurality of parallel two position shiftably mounted plates each having an operative engagement with an associated T-lever for being shifted to one of the two positions as determined by positioning of said T-levers upon engagement with said code members, a dielectric wiper carrier on each of said plates, and a bridging wiper in each of said carriers engaging said commutator segments to set up circuits in accord with positions of said plates.

27. A transmitter as defined in claim 26 wherein said wipers are carried at ends of said plates and alternate plates carry associated wipers at opposite ends.

28. In a record tape controlled transmitter, a group of elements for sensing the presence of recordations of a message tape comprising: a sensing pin mounting means having a plurality of parallel coplanar sensing pin guide channels; a plurality of record tape hole sensing pins each with a transverse notch adjacent one end slidably disposed in said channels; means to intermittently feed the tape past the sensing pin mounting means; a plurality of pivotally mounted independently movable sensing pin actuating members, each having two lever arm extensions, one of which is engaged in a transverse notch of an associated sensing pin; first resilient means biasing each set of said sensing pins and actuating members toward the tape; an intermittent cyclically operable link having a lost motion connection with all of said actuating members for engaging and shifting all of said actuating members and pins away from the tape against the resilient biasing force; and a plurality of two position code members, each of which has a connector portion adapted to be engaged by the other lever arm extension of an associated one of said actuating members for shifting of the code member by resiliently biased movement of the actuating member; and second resilient means, being weaker than said first resilient means, biasing each of said code members in a direction opposed to the bias of said first resilient means and tending to keep said connector portions in engagement with said other lever arm extensions.

29. In a record tape controlled transmitter: a group of elements for sensing the presence of recordations of a message tape including a plurality of permutatively positionable code members, each of which code members has a portion with permutatively arranged notches, a latching portion and a portion with coded electrical circuit determining abutment means, and means under the control of said group of elements for conditioning electric circuits indicative of combinations of recordations on said tape comprising: a plurality of drop-in members adapted to engage said code members, means biasing said drop-in members toward said code members, means associated with and adapted to engage said drop-in members to maintain them away from said code members and cyclically operative to permit said drop-in members to be biased against said code members, and circuit controlling individual switch means associated with individual ones of said drop-in members rendered operative by the degree of movement of said individual drop-in members permitted by the permutative positioning of said code members.

30. In a record tape controlled transmitter, a group of elements for sensing the presence of recordations of a message tape comprising a plurality of record tape hole sensing pins, a tape feed device, means reciprocably mounting said pins in parallel arrangement in a common plane normal to the tape, a plurality of pivotally mounted independently movable sensing pin actuating members, each having two lever arm extensions, one of which is connected to an associated sensing pin, first resilient means biasing each set of a sensing pin and actuating member toward the tape, an intermittent cyclically operable link having a lost motion connection with all of said actuating members for engaging and shifting all of said actuating members and pins away from the tape against the resilient bias; a plurality of two position code bars, each of which has a foot portion adapted to be engaged by the other lever arm extension of an associated one of said actuating members, second resilient means, weaker than said first resilient means, biasing all of said code bars in a direction tending to keep said feet in engagement with said other lever arm extensions; a coding switch circuit assembly having a plurality of circuit switches; and a storing and transfer assembly, having operative connections with said circuit switches, cyclically operative to engage said code bars and to store a code representation of recordations in the tape as set in said code bars by said sensing pins and transfer said code representation to said coding switch circuit assembly.

31. A transmitter as defined in claim 30, wherein each of said code bars has a pair of spaced abutment lugs located at the same position on each code bar; the cyclically operative storing and transfer assembly includes a cam operated two position transfer arm pivotally mounting a plurality of T-levers, corresponding in number to said code bars, and shiftable between engagement and disengagement of associated T-levers with one or the other of said two lugs on associated code bars; and the coding switch circuit assembly comprises a printed commutator with switch contact segments thereon, a plurality of parallel two position shiftably mounted plates each having an operative engagement with an associated T-lever for being shifted to one of its two positions as determined by positioning of said T-levers upon engagement with said code bars, a dielectric wiper carrier on each of said plates, and a bridging wiper in each of said carriers engaging said commutator segments to set up circuits in accord with positions of said plates.

32. The transmitter as defined in claim 30 wherein each of said code bars has a portion with permutatively arranged notches, and means are provided under the control of said code bars conditioning circuits indicative of combinations of recordations on said tape comprising a plurality of drop-in members adapted to engage said permutatively arranged notch portion of said code bars, means biasing said drop-in members toward said code bars, means associated with said drop-in members to maintain them away from said code bars and cyclically operative to permit said drop-in members to be biased against said code bars, and circuit controlling individual switch means associated with individual ones of said drop-in members' arms rendered operative by the degree of movement of said individual drop-in members permitted by the permutative positioning of said code bars.

33. A transmitter as defined in claim 32 wherein one of said drop-in arms is a latch which cyclically engages latching portions on said code bars.

34. A transmitter as defined in claim 32 wherein said switching means comprises a printed commutator circuit having switch contact segments thereon, at least a portion of said drop-in members have a dielectric wiper carrier secured thereto, and a segment bridging wiper carried by each said carrier engages said commutator contact segments in accord with the degree of movement of said drop-in members upon engagement with said code bars.

References Cited in the file of this patent

UNITED STATES PATENTS

| | | |
|---|---|---|
| 2,708,216 | Doerrfeld | May 10, 1955 |
| 2,766,318 | Bacon | Oct. 9, 1956 |
| 2,857,459 | Goetz | Oct. 21, 1958 |

UNITED STATES PATENT OFFICE
CERTIFICATION OF CORRECTION

Patent No. 2,982,817                              May 2, 1961

Edward F. Kleinschmidt et al.

It is hereby certified that error appears in the above numbered patent requiring correction and that the said Letters Patent should read as corrected below.

Column 2, line 20, for "Figure" read -- Figures --; column 4, line 75, strike out "of"; column 6, line 20, for "fed" read -- feed --; line 31, for "hte" read -- the --; column 7, line 18, for "to" read -- so --; column 9, line 3, for "and" read -- to --; column 11, line 29, for "has" read -- have --; line 46, for "and", second occurrence, read -- to --; line 47, for "monuted" read -- mounted --; same column 11, line 50, for "and" read -- to --; column 18, line 15, for "single" read -- signal --; column 19, line 29, for the claim reference numeral "24" read -- 19 --; line 61, for "cylindrically" read -- cyclically --; column 22, line 19, for "they" read -- them --.

Signed and sealed this 31st day of October 1961.

(SEAL)
Attest:

ERNEST W. SWIDER
Attesting Officer

DAVID L. LADD
Commissioner of Patents